July 13, 1965   G. G. THEALL   3,194,448
CYCLIC ADJUSTABLE VOLUME DISPENSING APPARATUS
Filed Nov. 28, 1962

INVENTOR.
GEORGE G. THEALL
BY
*McCarthy, Depaoli & O'Brien*
ATTORNEYS

United States Patent Office 3,194,448
Patented July 13, 1965

3,194,448
CYCLIC ADJUSTABLE VOLUME DISPENSING
APPARATUS
George G. Theall, West Chester, Pa., assignor to F & M
Scientific Corporation, a corporation of Delaware
Filed Nov. 28, 1962, Ser. No. 240,652
5 Claims. (Cl. 222—335)

The present invention relates to a meter valve and relates more particularly to a valve apparatus for measuring accurately very small quantities of liquid. The device is particularly designed for use with instruments requiring very small samples which are accurately determined, such as gas chromatography devices and the like.

In the prior art, diaphragm type motors, pumps, and valves of various types have been used for many purposes. The present invention makes use of the flexible diaphragm principle, but it does it in a novel way so as to make possible the very accurate determination of exceedingly small quantities of liquid. Gas chromatography devices are being used increasingly for purposes of chemical analysis, fractionation and separation of minor quantities of gases from each other and from liquids, and more recently for use in the study of biological materials such as blood, serum, and the like. In this type of operation, it is obviously essential to be able to handle minute quantities of sample, and still know accurately the quantities being handled and be certain that the intended quantities are actually being metered.

According to the present invention, an apparatus is provided which is especially suitable for measuring very small quantities. It is also designed so that the quantities measured can be varied or predetermined as desired. In its apparatus aspects, the invention makes use of an enclosed fluid compartment which has a flexible diaphragm as a closure. This closure is capable of flexing movement from a fixed inner or stop position to a variable outer position which, when preset, also is definite and fixed, the point of fixation being variable at the will of the operator. A resilient means normally urges the diaphragm closure to the fixed inner position; however, the resilient means is designed to yield to a periodically applied superior fluid pressure when fluid is forced into said compartment. Thus, the diaphragm closure is capable of assuming an outer position as determined by the setting of the adjustable outer limit stop and it thereby admits a flow of fluid into the measuring compartment. The adjustable positive means for selectively determining and limiting the outer position comprises a micrometer screw arrangement. This can be set with great accuracy, and thereby a precisely metered quantity of fluid is drawn into the compartment during each period of applied hydrostatic or hydraulic pressure.

Thus the yielding backings or return force for the flexible diaphragm closure is such that superior fluid pressure will force it back to the selected outer position and admit into the valve or pump a predetermined quantity of liquid. Then a control valve outside but connected to the apparatus is turned to another position to relieve the pressure and permit the fluid to flow out of the valve. A precisely measured quantity of fluid then flows out as the flexible diaphragm resumes its normal inner position under the influence of the resilient or return means which pushes it.

The invention also comprises method aspects; thus it comprehends a method of accurately metering small quantities of liquid under pressure. This method comprises hydrostatically forcing the fluid or liquid in one direction to distend a fluid restraining boundary element (the diaphragm of an equivalent element such as a piston may be used in appropriate cases) from an initial inner position or state against a yielding backing and return force until a definite predetermined yield limit is reached.

Then on reducing the hydrostatic force, for example by shifting of one valve (or more, if desired) so that fluid can flow out rather than in, the yielding backing force or return force is permitted to return restraining boundary element (e.g., the diaphragm) to its initial inner position and thereby eject the liquid which was forced into it in another direction. The operation may be repeated periodically. Obviously, the apparatus may be adjusted so that the volume metered can be varied within wide or substantial limits.

In its specific aspects, as presently preferred, the apparatus of the invention comprises not only a flexible diaphragm but also a backing plate accurately fitted to support the diaphragm and therefore capable of controlling with exactness the expansion of the fluid receiving chamber due to diaphragm flexing. The use of the backing plate makes much more certain the exact volumetric change which will occur as the diaphragm is flexed. This plate is backed up with an adjustable stop, e.g., a screw, preferably a micrometer screw which can be very finely adjusted, and thereby the highest degree of accuracy can be obtained.

Thus, for example, if it is desired to test a small sample of blood for content of certain gaseous or easily evaporable materials, this sample may be forced into the valve under a pressure of 35 p.s.i. This causes the diaphragm to flex and push the backing plate against the spring which supplies the return pressure. The strength of this spring is less than the force of the incoming fluid pressure. However, the adjustable stop or micrometer screw forms a definite limit stop and when the back up plate contacts this adjusting screw, whatever its setting, the diaphragm movement ceases. The apparatus is then filled to the sample capacity. Thereafter by switching the floor control valve from the incoming force to an outlet, the exactly metered quantity of fluid, for example blood, will be passed through the same line through which it flowed in, and it flows out to the test apparatus as the spring restores the diaphragm to its closed position. Obviously the invention can be applied to fluids other than blood or sera, although, for very small quantities this is an important use.

The invention will be understood more fully by reference to the drawings wherein.

Figure 1:
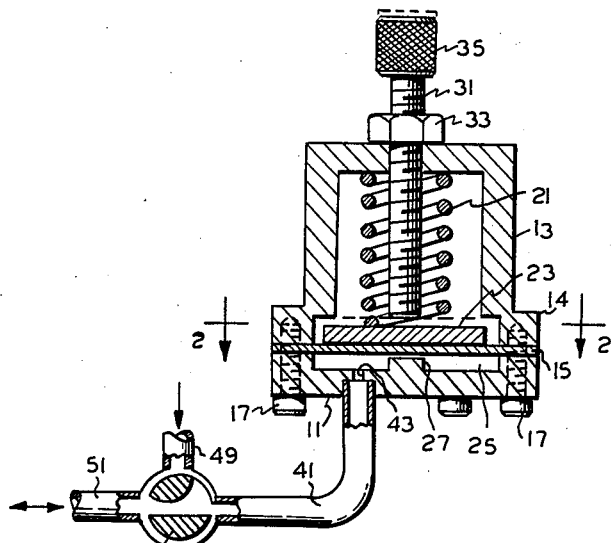
FIG. 1 is a sectional elevational view, somewhat enlarged, showing the essential elements of the apparatus.
Figure 2:
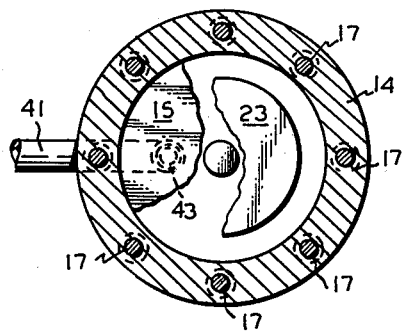
FIG. 2 is a horizontal cross-sectional view taken substantially on the line 2—2 of FIG. 1.

Referring now to FIG. 1, there is shown a circular base plate or lower valve body element 11 and an upper generally cylindrical casing or valve body top 13. The upper casing is provided with an enlarged annular flange 14 of the same outer diameter, substantially as the base plate 13. Between these elements 13, 14 is clamped a flexible diaphragm 15 which is secured in place and in liquid tight sealed relationship by means of suitable fastening devices such as the screws 17. Suitable gasket material, not shown is included to insure a tight seal. The upper casing or valve body 13 encloses a compartment which houses a compression spring 21. This normally presses against a follower plate 23 which overlies the central part of the diaphragm and is almost coextensive therewith. This plate is so fitted over the diaphragm as to control accurately its distension when it is forced upwardly. The lower valve element or plate 11 is hollowed out to form an annular liquid receptacle space 25 and it includes a protruding central stud or post 27 which serves as the limit stop for the diaphragm in its inner or relatively closed and partially empty position. The plate 23 normally floats on the diaphragm but when the diaphragm is forced upwardly by inflowing liquid, as will be explained below, this plate 23 is pushed upwardly against the force of spring 21. The spring is of sufficient strength to apply a substantial force on plate 23 at all times.

The upward movement of plate 23 is limited by the micrometer screw 31 which is threaded through the upper part of the valve head 13 and screw 31 can be locked in place when set by locknut 33. It has a milled head 35 which may also and desirably be provided with indicator or micrometer markings, not shown, but of any suitable type.

The valve body or disc 11 at the bottom which comprises the liquid receptacle 25 has connected thereto an inlet tube 41 which aligns with a small opening 43. Fluid, normally liquid, under suitable pressure can be introduced from any suitable source. As shown, a 2-way valve 47, is provided in line 41, and can be turned so that the liquid can be forced in, for example, from a sideline 49 and flow outward through a line 51 when the valve is turned to the position shown in FIGURE 1. Inflow through line 49 of course requires that the valve be turned to the other position.

In a typical operation, the micrometer screw 31 may be set essentially as shown in FIGURE 1. With valve 47 turned to the alternative position, fluid is forced in through line 49 at a suitable pressure—say, 35 lbs. per sq. inch. This is sufficient to overcome the force of spring 21 and to flex the diaphragm upwardly, raising the plate 23 until it contacts and is firmly stopped by the lower end of micrometer screw 31. Assuming now that compartment 25 is filled, valve 47 can be turned to the position shown in FIGURE 1. When this is done the spring 21 will force the compartment fluid outwardly through the means of follower plate 23 which restores the diaphragm 15 to its normal inner or closed position. Since the upward movement of the plate 23 is precisely limited, and the stop 27 limits the downward flexing of the diaphragm, the amount of sample introduced will be precisely the same as long as the setting of the micrometer screw 31 is not altered. Obviously, if desired, the lower limit stop 27 may be made adjustable in height in lieu of or in addition to the micrometer screw 31. Thus a screw may be used to replace stud 27. Normally it is preferred to keep the movable adjustable stop out of the liquid receptacle, and the arrangement shown in the drawings is ordinarily more desirable.

Now if it should be desired to change the size of the sample, all that is necessary is to loosen locknut 33 and readjust the micrometer screw 31, for example, to the dotted line position. This will permit the follower plate 23 to rise higher than before to its dotted line position. The next sample will then be larger than those previously measured, but all samples will be precisely uniform in quantity or volume as long as the setting of the micrometer screw is not disturbed.

It will therefore be understood that by relatively simple combination apparatus, some elements of which are well known and widely used in the prior art, a precise sampling and metering device is devised which meets the accuracy requirements of the gas chromatography art, particularly for blood and serum sampling, etc., which hitherto have not been successfully and economically met. A single inlet-outlet line, with provision for reversible flow, further simplifies the system. Obviously a pair of check valves, one flowing in and one flowing out may be inserted into branch lines 49, 51 in lieu of or in addition to the two-way valve 47.

It will be obvious that minor changes in addition to those already suggested in the apparatus can be made without departing from the spirit of this invention, and it is intended that the scope of the invention be determined by the following claims. These are to be interpreted as broadly as the state of the prior art permits.

What is claimed is:

1. Apparatus for dispensing accurately relatively small quantities of fluid comprising, in combination:

a fluid compartment having one wall closed by a diaphragm having an axis, said diaphragm being capable of an axial distending movement between a fixed first position corresponding to minimum compartment volume and a second position corresponding to maximum compartment volume, resilient means normally urging said diaphragm to said first position, said resilient means adapted to yield to sufficient fluid pressure within said compartment to distend said diaphragm to the second position thereby to admit a quantity of fluid into said compartment to be dispensed, adjustable means for selectively establishing said second position, thereby to vary the quantity of fluid dispensed from said compartment by said resilient means immediately upon the cessation of said sufficient fluid pressure, and a floating follower plate abutting said adjustable means, said resilient means, and a substantial portion of said diaphragm, thereby to accurately control the diaphragm distension and hence the quantity of dispensed fluid.

2. Apparatus according to claim 1 which also includes only a single conduit means connected to said compartment for accurately metering and dispensing said fluid.

3. Apparatus according to claim 1 wherein said resilient means includes a spring means adapted to store sufficient energy supplied by said fluid pressure to expel said precisely metered quantity of fluid.

4. Apparatus for dispensing accurately relatively small quantities of fluid comprising, in combination:

a disc-shaped member having a coaxial flanged portion about its periphery and a raised center portion along its axis thereby forming a recessed annular portion in said member, a disc-shaped flexible diaphragm having one face and another face, means for securing one face of said diaphragm to said annular flanged portion to provide a measuring chamber between said recessed annular portion and said diaphragm, resilient means secured to said disc-shaped member adapted to urge said diaphragm along said axis against said raised center portion, a single conduit means adapted to permit fluid access to the recessed portion of said chamber, means for supplying fluid under pressure through said conduit means to said measuring chamber, thereby to urge said diaphragm away from said raised center portion, a follower plate engaging a substantial portion of the other face of said diaphragm, and axially adjustable means abutting said follower plate for controlling the magnitude of diaphragm axial movement away from said center portion thereby to vary the quantity of fluid dispensed by said apparatus.

5. The apparatus set forth in claim 4 wherein said follower plate is floating with respect to said diaphragm and adapted to accurately control its distention thereby to improve its ability to dispense accurately relatively small quantities of said fluid.

References Cited by the Examiner

UNITED STATES PATENTS

| | | | |
|---|---|---|---|
| 1,454,765 | 5/23 | Patterson et al. | 222—335 |
| 2,300,110 | 10/42 | De Hoog | 222—43 |
| 2,740,941 | 4/56 | Kelly | 73—408 X |
| 2,793,793 | 5/57 | Sampson | 222—335 |
| 2,814,422 | 11/57 | Mercier | 222—335 |

LOUIS J. DEMBO, *Primary Examiner.*

EVERETT W. KIRBY, *Examiner.*